Aug. 21, 1934.    A. B. COLLINS    1,970,738
AUTOMATIC GEAR SHIFT
Filed Jan. 3, 1933    3 Sheets-Sheet 1
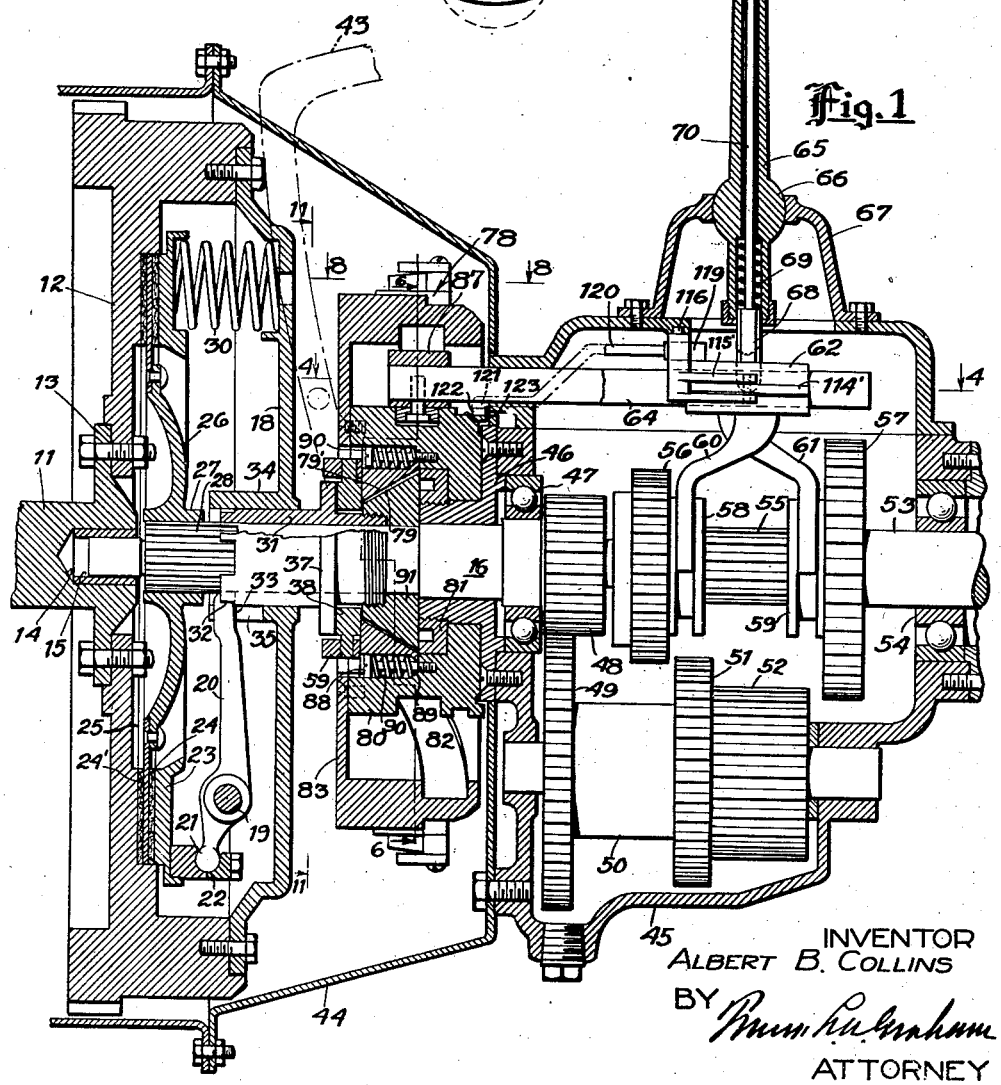
INVENTOR
ALBERT B. COLLINS
BY
ATTORNEY Aug. 21, 1934.   A. B. COLLINS   1,970,738
AUTOMATIC GEAR SHIFT
Filed Jan. 3, 1933   3 Sheets-Sheet 2
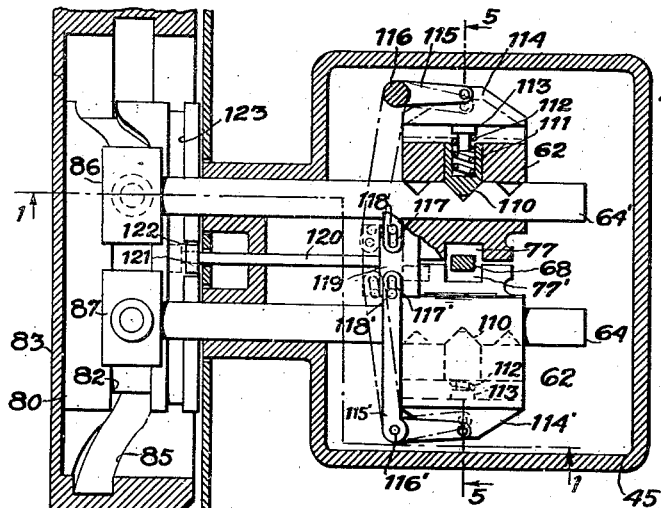
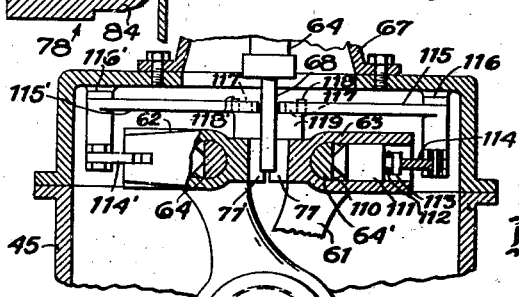
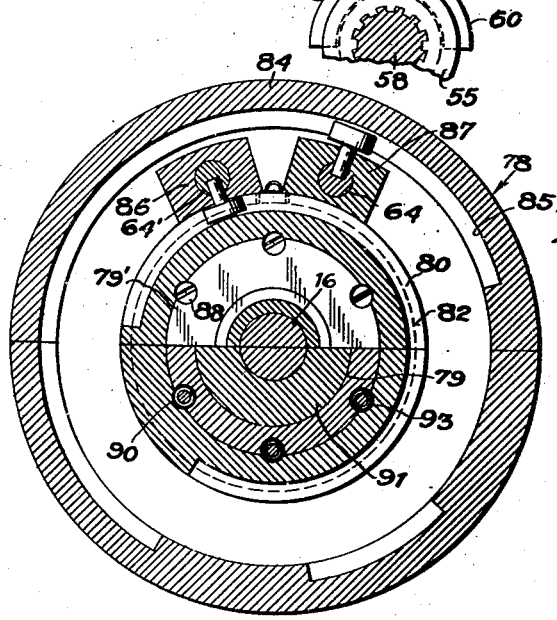
INVENTOR
ALBERT B. COLLINS
BY
ATTORNEY

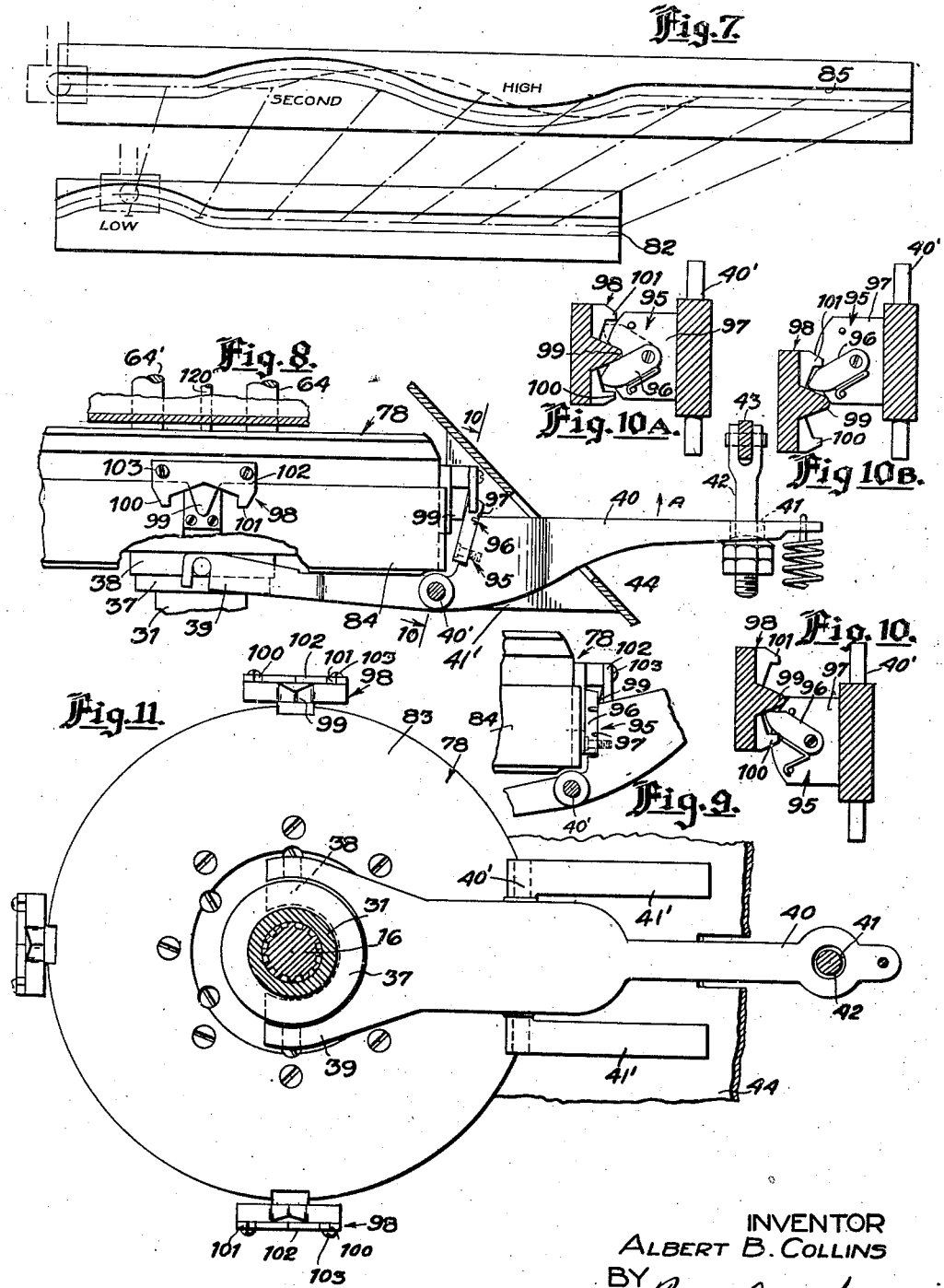

Patented Aug. 21, 1934

1,970,738

UNITED STATES PATENT OFFICE 1,970,738

AUTOMATIC GEAR SHIFT

Albert B. Collins, Santa Monica, Calif.

Application January 3, 1933, Serial No. 649,894

16 Claims. (Cl. 74—335)

This invention relates to power transmission systems such as are used in automobiles and is more particularly related to mechanical means for automatically shifting the gears in such a transmission system when the clutch is disengaged.

As is well known to those familiar with the art, the usual construction employed in the transmission system of the class described embodies a flywheel which is mounted upon the end of the crank shaft of the automobile engine, such flywheel carrying a clutch, the driven element of which is splined to what is ordinarily termed a driving shaft. This driving shaft extends into the transmission housing where it is provided with a pinion, and in the case of a socalled constant mesh transmission the pinion is in running engagement with a gear on a counter shaft which in turn carries transmission gears adapted to be selectively engaged by driven gears which are splined to a driven shaft and are shiftable thereon. The driven shaft is connected through a suitable universal joint with the propeller shaft.

Shifting forks are provided in the transmission housing for the purpose of selectively moving the last mentioned driven gears, such shifting forks being actuated in the conventional construction by a shifting lever. The shifting forks are ordinarily mounted upon shifter rods, and in some constructions the forks are movable relative to the rods, in other forms the forks are locked to the rods in which event the rods are movable in suitable guides.

It is one object of this invention to provide a device of the class described with cam means associated with the shifter rods and adapted to selectively move the shifter rods for shifting the gears.

It is a further object of this invention to provide the cam means with an auxiliary clutch, the driving element of which is operated from the crank shaft, such clutch being normally disengaged and associated with means for engaging the same when the main clutch of the transmission system is disengaged.

The track or tracks on the cam means, just referred to, are formed so as to operate the shifter rods in the usual sequence followed in starting the automobile. In other words the cams are constructed so that the gears are placed in low when the clutch is first thrown out, then carried to second, and then to high. It is an important feature of this invention that latch means are provided for automatically limiting the rotative movement of the cam means for each operation of the clutch pedal.

Since it is oftentimes desirable to manually shift the gears in cases such as parking the car or when driving in hilly country, it is a further object of this invention to provide the device with an adjustable shifting lever which may be selectively engaged with the forks and which, when engaged with the forks, renders the automatic shifting means inoperative.

In this connection it is a feature of the device that the shifting lever is employed to engage or render operative the automatic shifting means.

It is a still further object of this invention to produce a device of the class described which is of simple form and construction and which may, by a slight modification in the original parts be readily installed on a conventional type of automobile transmission system.

The details in the construction of my invention, together with other objects attending its production, will be best understood from the following description of the accompanying drawings which are chosen for illustrative purposes only, and in which—

Fig. 1 is a sectional elevation which may be considered as having been taken along the line 1—1 of Fig. 4, and which illustrates a preferred embodiment of my invention;

Fig. 2 is a fragmentary plan view taken in the general direction of the arrow 2 in Fig. 1;

Fig. 3 is a fragmentary sectional view showing the lower end of the gear shift lever as having been disengaged from the forks and moved to a position at which the automatic shifting mechanism is thrown into engagement;

Fig. 4 is a plan section taken in a plane represented by the line 4—4 in Fig. 1;

Fig. 5 is a fragmentary sectional elevation taken in a plane represented by the line 5—5 in Fig. 4;

Fig. 6 is a sectional elevation taken along the broken line 6—6 in Fig. 1;

Fig. 7 is a diagrammatic view showing a development of the cylindrical cams used to operate the shifter rods and illustrating the relative positions of the operating portions of the cam tracks;

Fig. 8 is a plan section taken in a plane represented by the line 8—8 in Fig. 1;

Fig. 9 is a fragmentary view similar to Fig. 8 and illustrating the clutch operating lever as having been moved to a position at which the main clutch is disengaged and the auxiliary clutch is thrown into engagement;

Figs. 10, 10A and 10B are sectional views illustrating the operation of the latch mechanism which limits the rotative movement of the cam member; and Fig. 11 is a sectional elevation taken in a plane represented by the line 11—11 in Fig. 1.

More particularly describing the invention as herein illustrated, reference numeral 11 indicates a crank shaft of an automobile which is secured to a flywheel 12 through the medium of a flange connection 13. The end portion of the crank shaft 11 is recessed as indicated at 14 to receive a pilot bearing 15 for a driving shaft 16.

The flywheel 12 is provided with a flywheel cover 18 having one or more fulcrumed pins 19, each of which supports a clutch plate operating lever 20. The outer end of the operating lever 20 is formed with a ball 21 received in a socket member 22 which in turn is mounted upon a driving clutch plate 23.

Reference numerals 24 and 24' indicate suitable inserts mounted in the opposed faces of the plate 23 and the inner face of the flywheel 12 between which a driven clutch plate 25 is positioned. The clutch plate 25 is mounted upon the periphery of a driven disk 26 which has a hub 27 mounted on the driven shaft 16 and splined to have sliding engagement with the splines 28 on the driven shaft.

The outer clutch plate 23 is pressed into engagement with the inner clutch plate 25 by means of clutch springs or a clutch spring indicated at 30.

Reference numeral 31 indicates a clutch actuated sleeve which is slidably and rotatably mounted upon the driven shaft 16, such sleeve being provided at its inner end with notches 32, one of which receives the inner end portion 33 of the clutch plate operating lever 20. The sleeve 31 has its bearing in a hub 34 formed in the cover plate 18, such hub being notched as indicated at 35 to permit the actuation of the lever 20. The sleeve 31 is axially movable relative to the hub 34 but rotates therewith.

The sleeve 31 is provided with a flange 37 which is engaged by a segmental collar 38 pivotally mounted in a yoke 39 formed on the end of a clutch throw-out lever or clutch operating lever 40 which in turn has a fulcrum pin 40' pivotally supported in a bearing bracket 41'. The end of the clutch throw-out lever 40, as shown in Fig. 8, is provided with an aperture 41 adapted to receive a pin 42 whereby it is actuated from the foot pedal lever 43.

The flywheel and clutch is enclosed by, what I may term, a flywheel housing 44, and reference numeral 45 indicates a transmission housing which is secured to the flywheel housing in the conventional manner.

The driving shaft 16 extends through a bushing 46 mounted in the transmission housing and is supported by a bearing 47 mounted in the opening of the transmission housing. The inner end of the driving shaft 16 is provided with a pinion gear 48 which engages a gear 49 mounted on a counter shaft 50 which in turn is provided with gears indicated at 51 and 52.

Reference numeral 53 indicates a driven shaft, one end of which has a pilot bearing and a direct drive clutch (not shown) in the end of the driving shaft. An intermediate portion of the driven shaft is supported by a bearing 54 in the transmission housing and the other end is connected through a universal joint with the propeller shaft (not shown). This driven shaft is splined, as indicated at 55, to receive shiftable gears 56 and 57. The gears 56 and 57 are each provided with a collar 58 and 59, respectively, whereby they may be moved axially along the shaft in a selective manner by means of shifting forks 60 and 61.

The upper ends of forks 60 and 61 are provided with sleeve members 62 and 63 which receive shifter rods 64 and 64'. The forks are adapted to be manually moved on the shifter rods for shifting the gears by means of a shifting lever 65 which is provided with a ball bearing 66 received in a shifting lever housing 67.

In this form of my invention, the shifting lever is made hollow and is provided at its lower end with a plunger 68 pressed downwardly by a spring 69 and supported by a rod 70 and a flexible shaft 71 which is secured at its upper end to a cam rotor 72 contained within a ball or knob 73 rotatably mounted on the upper end of the shifting lever. The knob 73 contains a socket member 74 which is provided with a pin 75 adapted to travel in the cam groove 76, this last mentioned mechanism being effective to lift the plunger 68 against the action of the spring 69 from a position at which it will engage in notches 77 and 77' formed in the sleeve members 62 and 63 respectively.

The construction as described so far, except for the gear shift lever, is a conventional type found in autuomobile transmission systems which employ the so-called constant mesh transmission. It is to be understood, however, that clutches other than the single plate type described herein and variations in the transmission, may be employed without in any way affecting the automatic gear shifting means which forms the subject matter of this invention.

As was pointed out in the early part of the specification, it is one object of this invention to provide mechanically actuated means for shifting the gears in a predetermined sequence, such shifting means being actuated to make one shift each time the clutch is disengaged. This shifting action in this form of my invention is obtained by actuating the shifter rods 64 and 64' with a rotatable cam member or cam means 78 which is rotated a predetermined amount (which may vary with each speed, depending upon the "shifting speed" required for the particular set of gears in which the device is used) from the crank shaft or, more specifically, from the flywheel cover 18 through the medium of an auxiliary clutch 79 each time the clutch operating lever 40 presses the flange 37 and the sleeve 31 forward to disengage the main clutch plate 26.

The cam member 78 comprises, what I may term, an inner cam collar 80 which is adapted to be rotated about the driving shaft 16 and has its bearing upon the bushing 46 where it is held against outward movement by means of a threaded collar 81 mounted on the bushing. The inner cam collar 80, which I may term a low gear cam, has a cam track 82, a form of which is best illustrated in the development in Fig. 7. Mounted on the inner cam collar 80 through the medium of an inwardly extending flange 83 is, what I may term, an outer cam collar or "second-high" gear cam 84 which has a cam track 85 formed on its inner surface opposite the cam track 82. These cam tracks 82 and 85 receive followers 86 and 87 which are mounted on the ends of the shifter rods 64 and 64' respectively.

The auxiliary clutch 79 comprises, what I may term, a slip clutch as distinguished from the ordinary grab clutch, and consists of a driven clutch member or a collar 79' which is mounted in a recess formed in the inner cam collar 80 and is held therein by means of a plurality of screws 88 which extend through eyes 89 formed at the inner ends of recesses 90 provided in the periphery of the driven clutch collar 79'. The clutch collar 79' is formed with a conical inner surface which engages a correspondingly formed surface on a driving clutch cone 91 which is threadedly mounted upon the end portion of the sleeve 31. The two engaging surfaces between the members, just referred to, are normally in slightly spaced relation with each other, the outer or driven member being held in its proper position by means of compression springs 93 which are interposed between the heads of the screws 88 and the bottoms of the recesses 90.

From the construction so far described, it will be seen that, when the clutch throw-out lever 40 is swung upon its fulcrum pin 40' swinging in the direction of the arrow A in Fig. 8 to disengage the main clutch by pressing against the flange 37, the resultant movement of the sleeve 31 will pull the auxiliary clutch driving cone 91 forwardly into pressure engagement with the auxiliary clutch driven collar 79' and against the action of the compression springs 93. This movement of the lever will be effective to disengage the latch member, indicated at 95 (Fig. 8), and the movement of the sleeve and inner cone will be effective to rotate the outer auxiliary clutch member and its associated cam collars to move one of the shifter rods, the shifting of the gears in the meantime having been made possible through the disengagement of the main clutch.

The latch member 95, just referred to, is constructed so as to positively limit the rotation of the cam collars for each disengagement of the clutch. The construction and operation of this latch is perhaps best illustrated in Figs. 8 to 10A inclusive, where the latch is shown as comprising a spring pressed pawl 96 pivotally mounted upon a surface 97 formed on the throw-out lever 40 and situated so as to be engaged by a system of offset stop members generally indicated by reference numeral 98.

The stop means 98 comprises an inner tongue or projection 99 which is positioned so as to lie in the path of the pawl member 96 when the clutch throw-out lever has been moved to a disengaging position as indicated in Fig. 9. In addition to the stop member 99, I provide a pair of offset stops 100 and 101 which may be formed integrally with the stop member 99 or may be formed on a separate plate 102, the whole unit being secured to the periphery of the outer cam member through the medium of screws 103. These outer stops 100 and 101 are situated in the plane of the pawl member when the operating lever has been moved to the "clutch-engaged" or normal operating position as shown in Fig. 8. In this case it is to be understood that when referring to the engaged and disengaged positions with respect to the clutch operating or clutch throw-out lever, I have reference to the main clutch and not the auxiliary clutch. In other words, for the engaged position of the clutch throw-out lever 40, the auxiliary clutch is disengaged.

The normal operation of this latch is perhaps best illustrated in Figs. 10 to 10B inclusive considering these figures in conjunction with Figs. 8 and 9. Fig. 8, for example, shows the clutch throw-out lever and the latch in the position at which these parts are arranged during normal driving operation. When the clutch is disengaged (the auxiliary clutch at the same time being thrown into engagement) the clutch throw-out lever and the latch move to the position shown in Fig. 9. At the same time the engagement of the auxiliary clutch carries the clutch collar unit in the direction of the crank shaft rotation bringing the next stop member into a position where the pawl engages the central stop 99 as shown in Fig. 10. The continued movement moves the pawl downwardly against the action of the spring to the position shown in Fig. 10A, and the cam collar unit is held against further rotation in this position even though the clutch may be held out, under which circumstances the driving cone rotates in the auxiliary clutch collar against the action of the compression springs 93. When the clutch throw-out lever is released the pawl moves back to the position shown in Fig. 8 and immediately is swung upwardly by the action of compression springs to the dotted line position 10A where it lies below the stop member 101. When in this position the cam unit may be drawn downwardly to the position shown in Fig. 10B without in any way interferring with the operation of the transmission system.

It will be understood that the cam tracks 82 and 85 are provided with curves or humps indicated by "low", "second", and "high" in Fig. 7. These terms correspond to the gears which are moved into mesh by the respective cam operating surfaces, and, as pointed out herein above, the extent or degree of curvature of the "actuating" section of the track may vary with the different gears depending upon the proper "shifting" speed for such gears. For the purpose of illustration, however, I show the humps or curves of equal characteristics. The straight portions of the cams hold the followers in a position at which the gears are in neutral.

The stop members, of which there are four in number as shown in Fig. 11, are positioned so as to stop the cam unit at a point at which one of the followers is held in the peak of its corresponding cam curve. It will be observed that there are three such positions on the cams corresponding to the three "forward" gears in the ordinary three speed transmission, and the fourth stop is adapted to lock the shifter rods in a neutral position. From Fig. 7, in which the dot and dash line on the larger cam corrects for the offset relation of the followers, it will be observed that as the "low" gear follower 86 and shifter rod enters the neutral portion of the cam track 82 the "second-high" gear follower 87 is entering the second gear peak of the cam track 85. The continued movement of the cam carries the follower and the shifter rod to a point at which the second gear 57 on the driven shaft is in mesh with its corresponding pinion 52, such point being reached at the peak of the "second" curve on the cam track 85. At this point the corresponding stop on the cam unit has engaged the pawl on the throw-out lever thus holding the gears in this position until the clutch is again disengaged at which time the second-high gear follower is carried into the peak of the next curve indicated by "high" at which the second gear is disengaged and the direct connection is established between the driven and driving shaft in the conventional manner.

Since, as was pointed out in the early part of the specification, it is desirable to have means whereby the gears may be manually shifted such as to put the gears in reverse, etc., it is important that means be provided for permitting the operation of the shifter forks without operating the shifter rods. To accomplish this, I provide both shifter rods with a notch or a series of notches indicated by reference numeral 110 adapted to receive a plunger member 111 mounted in the sleeve member 63 or 62, as the case may be. These plunger members are each made hollow and each contains a compression spring 112 which receives a button 113. The buttons 113 on the two plunger members are adapted to be engaged by shoes 114 and 114' which are pivotally mounted on bell cranks 115 and 115', such cranks being pivoted at 116 and 116' respectively. These bell cranks have arm portions, which extend inwardly toward each other, and which are provided at their inner ends with slots 117 and 117', such slots receiving pins 118 and 118' in a movable block 119.

The block 119 is provided with a forwardly extending bar 120 which has on its end a block 121 adapted to be received in a notch 122 formed on the outer surface of the inner cam collar 80 and communicating with an annular groove 123, also formed in the periphery of the cam collar 80.

When the parts are arranged in the position shown in full line of Fig. 4, which is the neutral position, with the plunger 68 on the lower end of the shifter rod positioned between the recesses in the forks, the shoes 114 and 114' are pressed outwardly by the compression springs and, through the action of the bell cranks 115 and 115', the block 119 and the bar 120 are drawn rearwardly toward the forks so as to position the block 121 in the notch 122 which is formed in the periphery of the low gear cam. When in this position the gears may be shifted in the conventional manner by means of the gear shift lever, the plungers 111 riding into the respective notches in the shifter rods which remain fixed.

As pointed out above, the shifter rods remain in fixed position when the parts are arranged for manual operation. This is accomplished by constructing the cam tracks so that when the notch 122 is positioned to receive the block 121, both followers 86 and 87 are in the neutral portions of their respective tracks, and when in this position the block 122 and the notch 121 are effective to hold the cam unit against rotation so that the driving cone in the auxiliary clutch merely rotates against the action of the compression springs 93 when the auxiliary clutch is engaged. In other words, the automatic shifting unit is locked against operation and the transmission becomes a conventional manually operated type.

When it is desired to use the automatic shift, the knob 73 on the shifting lever is rotated to the broken line position shown in Fig. 2, such rotation being effective to lift the plunger 68 into the dotted line position shown in Fig. 1. The shifting lever is then pulled rearwardly so that its lower end assumes the position shown in Fig. 3 where the block 119 as shown in Fig. 4 has been moved forwardly into the dot and dash line position, thus pressing the shoes inwardly against the buttons 113, thereby locking the forks to the shifter rods. This action is also effective to move the block 122 on the end of the bar 120 into the groove 123 which permits the free rotation of the cam unit and at the same time presses the shoes 114 and 114' into engagement with the buttons 113 against the action of the spring 112, thereby locking the forks to the shifter rods. After the gear shift lever has been set or adjusted in the manner just described, the first forward movement of the clutch pedal to disengage the clutch will simultaneously engage the auxiliary clutch and, since the cam unit is now free to rotate, such unit will be moved through 90° of rotation until the latch member is engaged by the first stop in which position the low gear shifter rod 64' actuated by follower 86 has thrown the low gear into mesh with its corresponding driving pinion on the counter shaft. The second disengagement of the clutch releases the cam latch, engages the auxiliary clutch, and rotates the cam to disengage the low gear and move the second gear into engagement through the action of the "second" peak on cam track 85 and the corresponding follower 87. The third operation of the auxiliary clutch and the cam unit releases the second gear and establishes a direct connection between the drive shaft and the driven shaft. The fourth operation of the clutch carries the shifter rods into a neutral position and, at this point, the plunger, which has dropped into the notch in the "high gear" fork, moves the shifting lever into the neutral position from which point the system is again set for manual operation.

In the actual construction and operation, the shifting lever is moved to "high" position when the plunger 68 is withdrawn for setting the automatic shift. This positioning of the shifting lever may be done by the driver following instructions for operation, but to render the device fool proof I may provide suitable guide means on top of the forks which will permit the movement of the shifting lever to the "high" position only, when the plunger 68 is withdrawn. In view of the pitch of the cam track 76' and the action of the spring 69, the plunger is immediately pressed downwardly when the knob is released so that it drops into the notch in the "second-high" fork when the cam moves this fork into "high" position. Thus the shifting lever is automatically returned to its neutral position by the fork with the fourth movement of the cam which returns the shifter rods and their associated parts to the full line position shown in Fig. 4. In this position the transmission becomes a conventional manually operated type which necessitates the withdrawal of the plunger 68 before the automatic means can again be brought into operation. It will thus be seen that if the machine is running in high the clutch can be disengaged and the shifting lever moved manually directly into second from the neutral position as in ordinary driving operations.

It will be apparent from the foregoing description that the device contemplated by this invention provides a simple and efficient means for automatically shifting the gears merely by operation of the clutch pedal, and that such device has the advantage of permitting manual operation at any time.

It is to be understood that, while I have herein described and illustrated one preferred form of my invention, the invention is not to be limited to the precise construction as described above but includes within its scope whatever changes fairly come within the spirit of the appended claims.

I claim as my invention:

1. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifting means including shifter rods in said transmission; an auxiliary clutch having a driving element and a driven element rotatably mounted on said driving shaft; means for simultaneously disengaging said first mentioned clutch and engaging said auxiliary clutch; cam means associated with the driven element of said auxiliary clutch and adapted to be rotated thereby when said auxiliary clutch is engaged; and cam followers on said shifter rods engaging said cam means.

2. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifting means including shifter rods in said transmission; an auxiliary clutch having a driving element and a driven element rotatably mounted on said driving shaft; means for simultaneously disengaging said first mentioned clutch and engaging said auxiliary clutch; cam means associated with the driven element of said auxiliary clutch and adapted to be rotated thereby when said auxiliary clutch is engaged; and cam followers on said shifter rods engaging said cam means, said cam means having tracks designed to operate said shifter rods independently of each other.

3. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifting means including a pair of shifter rods in said transmission; an auxiliary clutch having a driving element and a driven element rotatably mounted on said driving shaft; means for simultaneously disengaging said first mentioned clutch and engaging said auxiliary clutch; cam means associated with the driven element of said auxiliary clutch and adapted to be rotated thereby when said auxiliary clutch is engaged; and cam followers on said shifter rods engaging said cam means, said cam means comprising an inside cylindrical cam and an outside cylindrical cam each having a cam track engaged by one of said followers, said cam tracks being formed so as to actuate each shifter rod independently of the other.

4. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifting means including shifter rods in said transmission; an auxiliary clutch having a driving element and a driven element rotatably mounted on said driving shaft; means for simultaneously disengaging said first mentioned clutch and engaging said auxiliary clutch; cam means associated with the driven element of said auxiliary clutch and adapted to be rotated thereby when said auxiliary clutch is engaged; cam followers on said shifter rods engaging said cam means; and releasable lock means for limiting the rotative movement of said cam means.

5. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifting means including shifter rods in said transmission; an auxiliary clutch having a driving element and a driven element rotatably mounted on said driving shaft; clutch operating means for simultaneously disengaging said first mentioned clutch and engaging said auxiliary clutch; cam means associated with the driven element of said auxiliary clutch and adapted to be rotated thereby when said auxiliary clutch is engaged; cam followers on said shifter rods engaging said cam means; and releasable lock means actuated by said clutch operating means for limiting the rotative movement of said cam means.

6. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifting means including shifter rods in said transmission; an auxiliary clutch having a driving element and a driven element rotatably mounted on said driving shaft; means including a clutch throw-out lever for simultaneously disengaging said first mentioned clutch and engaging said auxiliary clutch; cam means associated with the driven element of said auxiliary clutch and adapted to be rotated thereby when said auxiliary clutch is engaged; cam followers on said shifter rods engaging said cam means; and releasable lock means comprising offset stop members on said cam means and a latch on said clutch throw-out lever adapted to be engaged thereby for limiting the rotative movement of said cam means for each engagement of said auxiliary clutch.

7. In combination with a crank shaft and a driving shaft: a clutch having a driving element mounted on said crank shaft and a driven element engaging said driving shaft; a transmission having gears adapted to be selectively driven from said driving shaft when said clutch is engaged; gear shifter rods in said transmission; shifter forks slidably mounted on said shifter rods and engaging said gears; an auxiliary clutch having a driving element and a driven element rotatably mounted on said driving shaft; means for simultaneously disenangaging said first mentioned clutch and engaging said auxiliary clutch; cam means associated with the driven element of said auxiliary clutch and adapted to be rotated thereby when said auxiliary clutch is engaged; cam followers on said shifter rods engaging said cam means; a manually operated shifting lever adapted to engage said shifter forks; means for lifting said shifting lever out of engagement with said forks; and means actuated by said shifting lever when it is out of engagement with said forks for locking said forks to said shifter rods.

8. In combination with an automobile transmission system having a driving shaft, a driven shaft, a crank shaft and a clutch for operating said driving shaft, and means including shiftable gears on said driven shaft for transmitting power from said driving shaft to said driven shaft, gear shifting means embodying: shifter forks engaging said gears; shifter rods engaging said forks; cam followers on the ends of said shifter rods; cams engaging said cam followers; and means for rotating said cams when said clutch is disengaged, said last mentioned means comprising an auxiliary clutch having a driving element connected with said crank shaft and a driven element connected with said cams, a clutch operating lever, means actuated by said clutch operating lever for simultaneously disengaging said first mentioned clutch and engaging said last mentioned clutch, and latch means on said cams and said lever for limiting the rotation of said cams for each engagement of said auxiliary clutch.

9. In combination with an automobile transmission system having a driving shaft, a driven shaft, a crank shaft and clutch for operating said driving shaft; and means including shiftable gears on said driven shaft for transmitting power from said driving shaft to said driven shaft, gear shifting means embodying: shifter forks engaging said gears; shifter rods slidably engaging said forks; a manual shifting lever adapted to be swung into engagement with said forks; means for lifting said shifting lever out of shifting engagement with said forks; means actuated by said shifting lever when out of engagement with said forks for locking said forks to said shifter rods; and means for actuating said shifter rods in predetermined sequence when said clutch is disengaged.

10. In combination with an automobile transmission system having a driving shaft, a driven shaft, a crank shaft and clutch for operating said driving shaft, means for disengaging said clutch, and means including shiftable gears on said driven shaft for transmitting power from said driving shaft to said driven shaft, gear shifting means embodying: shifter forks engaging said gears; shifter rods slidably engaging said forks; a manual shifting lever adapted to be swung into engagement with said forks; means for lifting said shifting lever out of shifting engagement with said forks; means actuated by said shifting lever when out of engagement with said forks for locking said forks to said shifter rods; and means controlled by said clutch disengaging means for actuating one of said shifter rods when said clutch is disengaged.

11. In combination with an automobile transmission system having a driving shaft, a driven shaft and clutch for operating said driving shaft, a single clutch operating lever, and means including shiftable gears on said driven shaft for transmitting power from said driving shaft to said driven shaft, gear shifting means embodying: shifter forks engaging said gears; shifter rods engaging said forks; and means controlled by said single clutch operating lever and actuated by said crank shaft for actuating said shifter rods successively in predetermined sequence during the successive disengagement of said clutch.

12. In an automobile, the combination of: a transmission having shiftable gears; forks for shifting said gears; shifter rods for actuating said forks; cam followers on said shifter rods; cams engaging said followers; and a clutch connected with the crank shaft of said automobile for driving said cams.

13. In an automobile, the combination of: a transmission having shiftable gears; a crank shaft and a main clutch for driving said transmission; forks for shifting the gears in said transmission; shifter rods for actuating said forks; cam followers on said shifter rods; cams engaging said cam followers; an auxiliary clutch for driving said cams; means for driving said auxiliary clutch from said crank shaft; and means for simultaneously disengaging said main clutch and engaging said auxiliary clutch.

14. In an automobile, the combination of: a transmission having shiftable gears; a crank shaft and a clutch for driving said transmission; a single operating lever for actuating said clutch; forks for shifting said transmission gears; shifter rods for actuating said forks; cam followers on said shifter rods; cylindrical cam means positioned in a plane normal to the direction of movement of said shifter rods and having tracks engaging said followers; and means controlled by said clutch operating lever for imparting segmental rotation to said cam means 15. In an automobile, the combination of: a transmission having shiftable gears; a crank shaft and a clutch for driving said transmission; a single operating lever for actuating said clutch; forks for shifting said transmission gears; shifter rods for actuating said forks; cam followers on said shifter rods; cylindrical cam means comprising inner and outer cylindrical surfaces radially spaced away from an axis which is substantially parallel with said shifter rods; cam tracks on said cylindrical surfaces engaging the respective cam followers; and means controlled by said clutch operating lever for imparting segmental rotations to said cam means.

16. For use in combination with an automobile transmission system having forks and shifter rods for shifting the gears therein, a clutch for driving said gears and a single pedal for actuating said clutch; a cylindrical cam member mounted to rotate on an axis which is parallel with said shifter rods and having tracks for engaging and moving said shifter rods independently of each other; and means controlled by said pedal for imparting segmental rotation to said cam nber.

ALBERT B. COLLINS.